United States Patent
Bodin (10) Patent No.: US 10,131,386 B2
(45) Date of Patent: Nov. 20, 2018

(54) NOSE-DIVE REDUCING SUSPENSION LOCK ARRANGEMENT FOR MOTOR VEHICLE

(71) Applicant: BAE Systems Hägglunds Aktiebolag, Örnsköldsvik (SE)

(72) Inventor: Anders Bodin, Sverige (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 79 days.

(21) Appl. No.: 15/100,121

(22) PCT Filed: Nov. 18, 2014

(86) PCT No.: PCT/SE2014/051369
§ 371 (c)(1),
(2) Date: May 27, 2016

(87) PCT Pub. No.: WO2015/080652
PCT Pub. Date: Jun. 4, 2015

(65) Prior Publication Data
US 2017/0001672 A1    Jan. 5, 2017

(30) Foreign Application Priority Data

Nov. 29, 2013  (SE) ..................................... 1351422

(51) Int. Cl.
*B62D 55/116*  (2006.01)
*B60G 17/016*  (2006.01)
(Continued)

(52) U.S. Cl.
CPC ............ *B62D 55/116* (2013.01); *B60G 11/00* (2013.01); *B60G 15/06* (2013.01); *B60G 17/005* (2013.01);
(Continued)

(58) Field of Classification Search
CPC .... B62D 55/116; B62D 55/104; B60G 11/00; B60G 15/06; B60G 17/005; B60G 17/016;
(Continued)

(56) References Cited

U.S. PATENT DOCUMENTS 2,574,280 A    11/1951  Obert
3,047,283 A    7/1962  Kivell
(Continued)

FOREIGN PATENT DOCUMENTS

DE         884156 C       7/1953
DE       1455498 A1       8/1969
(Continued)

OTHER PUBLICATIONS

Office Action received for Australian Patent Application No. 2014355195, dated Jun. 20, 2017, 3 pages.
(Continued)

*Primary Examiner* — Tuan C To
(74) *Attorney, Agent, or Firm* — Morrison & Foerster LLP (57) ABSTRACT

The present invention relates to a method for controlling a suspension system of a motor vehicle comprising a vehicle body and a plurality of wheel pairs (2a/2b, 2c/2d), wherein the suspension system comprises spring members arranged for resilient connection between the wheels of the vehicle and said vehicle body. The method comprises the step of: monitoring at least one first parameter indicating braking of thee motor vehicle, and when said parameter indicates braking of the motor vehicle, preventing compression of the spring members of at least one wheel pair (2a/2b, 2c/2d) of the motor vehicle for counteracting a rotation of the vehicle body in connection to braking.

19 Claims, 7 Drawing Sheets (51) Int. Cl.
  *B60G 11/00* (2006.01)
  *B60G 15/06* (2006.01)
  *B60G 17/005* (2006.01)
  *B62D 55/104* (2006.01)
  *B60G 17/06* (2006.01)

(52) U.S. Cl.
  CPC ....... *B60G 17/016* (2013.01); *B60G 17/0164* (2013.01); *B60G 17/06* (2013.01); *B62D 55/104* (2013.01); *B60G 2202/134* (2013.01); *B60G 2300/32* (2013.01); *B60G 2400/202* (2013.01); *B60G 2400/204* (2013.01); *B60G 2400/39* (2013.01); *B60G 2400/41* (2013.01); *B60G 2400/92* (2013.01); *B60G 2500/10* (2013.01); *B60G 2500/20* (2013.01); *B60G 2800/014* (2013.01)

(58) Field of Classification Search
  CPC ................ B60G 17/0164; B60G 17/06; B60G 2202/134; B60G 2300/32; B60G 2400/202; B60G 2400/204; B60G 2400/39; B60G 2400/41; B60G 2400/92; B60G 2500/10; B60G 2500/20; B60G 2800/014
  See application file for complete search history.

(56) References Cited

U.S. PATENT DOCUMENTS

| | | | |
|---|---|---|---|
| 3,992,039 A | 11/1976 | Hiruma | |
| 4,686,626 A | 8/1987 | Kuroki et al. | |
| 4,741,554 A | 5/1988 | Okamoto | |
| 5,390,949 A | 2/1995 | Naganathan et al. | |
| 5,909,780 A * | 6/1999 | De Andrade | B60G 11/20 180/294 |
| 6,097,999 A * | 8/2000 | Shal | B60G 17/0162 280/5.506 |
| 6,181,997 B1 * | 1/2001 | Badenoch | B60G 17/015 280/5.512 |
| 6,276,693 B1 * | 8/2001 | Oakley | B60G 17/0162 280/124.106 |
| 7,785,423 B1 * | 8/2010 | Midkiff | B60S 3/04 134/123 |
| 2006/0181034 A1 * | 8/2006 | Wilde | B60G 15/12 280/5.515 |
| 2010/0133018 A1 * | 6/2010 | Hertema | A61G 5/066 180/6.48 |
| 2010/0133775 A1 * | 6/2010 | Roland | B60G 3/26 280/124.179 |
| 2010/0236844 A1 * | 9/2010 | Howe | B62D 23/005 180/9.62 |
| 2011/0079168 A1 * | 4/2011 | Kumar | B61C 15/04 105/209 |
| 2011/0241299 A1 * | 10/2011 | Harada | B60T 8/1755 280/5.513 |
| 2011/0257841 A1 * | 10/2011 | Hara | B62K 25/04 701/37 |
| 2012/0053791 A1 * | 3/2012 | Harada | B60G 17/08 701/38 |
| 2013/0197754 A1 * | 8/2013 | Lee | B60G 17/0157 701/37 |
| 2013/0197756 A1 * | 8/2013 | Ramirez Ruiz | B60G 7/003 701/40 |
| 2014/0008141 A1 * | 1/2014 | Kageyama | B62D 5/00 180/400 |
| 2014/0095024 A1 * | 4/2014 | Hirao | B60G 17/018 701/37 |
| 2014/0131960 A1 * | 5/2014 | Moore | B60G 17/0165 280/5.514 |
| 2014/0195115 A1 * | 7/2014 | Muller | B60G 21/00 701/37 |
| 2015/0035247 A1 * | 2/2015 | Yoshimi | B60G 7/02 280/124.136 |
| 2015/0183443 A1 * | 7/2015 | Iwamura | B61F 5/24 188/267 |
| 2015/0217766 A1 * | 8/2015 | Kelly | F16H 61/0213 701/94 |
| 2016/0107498 A1 * | 4/2016 | Yamazaki | B60G 17/016 701/37 |

FOREIGN PATENT DOCUMENTS

| | | |
|---|---|---|
| EP | 0279507 A2 | 8/1988 |
| EP | 0279507 A3 | 10/1989 |
| EP | 0428096 A1 | 5/1991 |
| JP | 1-122718 A | 5/1989 |
| JP | 08295115 A * | 11/1996 |
| JP | 2009255697 A * | 11/2009 |
| WO | 2011061626 A2 | 5/2011 |
| WO | 2011061626 A3 | 7/2011 |

OTHER PUBLICATIONS

International Search Report and Written Opinion received for PCT Patent Application No. PCT/SE2014/051369, dated May 3, 2015, 11 pages.
Extended European Search Report includes (Supplementary European Search Report and European Search Opinion) received for European Patent Application No. 14865051.8, dated Jun. 27, 2017, 10 pages.
International Preliminary Report on Patentability received for PCT Patent Application No. PCT/SE2014/051369, dated Jun. 9, 2016, 8 pages.
Office Action received for Australian Patent Application No. 2014355195, dated May 31, 2018, 3 pages.

* cited by examiner

NOSE-DIVE REDUCING SUSPENSION LOCK ARRANGEMENT FOR MOTOR VEHICLE

CROSS-REFERENCE TO RELATED APPLICATION

This application is a U.S. National Stage patent application of PCT/SE2014/051369, filed on Nov. 18, 2014, which claims priority to Swedish Application No. 1351422-9 filed on Nov. 29, 2013, the entire contents of each one of which is incorporated herein by reference.

TECHNICAL FIELD

The invention relates to a method for controlling a suspension system of a motor vehicle, such as a tracked vehicle. Further, the invention relates to a suspension system of a motor vehicle, a motor vehicle and a computer program for controlling a suspension system of a motor vehicle.

BACKGROUND

Roadholding, driving characteristics and comfort are important parameters of motor vehicles such as cars, military vehicles, trucks and the like. In order to improve roadholding, driving characteristics and comfort vehicles are equipped with suspension systems, which are arranged to protect the vehicle, passengers and load from damages and wear. A suspension system comprises spring members for maintaining the vehicle on the right level and absorb impacts such that irregularities in the ground do not propagate to the vehicle body, and damping members for extinguishing the suspension movement of the vehicle body. The damping member also contributes to converting kinetic energy of the vehicle body to heat for preventing impact of the suspension system, particularly of terrain vehicles.

In so called passive damping systems the damping when for example jumping with the vehicle in a ramp-like situation is normally too low, which results in the vehicle by impact is strongly pressed together, which results in great stresses on the vehicle and low comfort. This may with a passive damping system be solved by increasing the damping of the damping system. This however results in the disadvantage that the damping becomes too high during normal drive on grounds with small irregularities, which results in low comfort.

Lately more active damping systems adapting to the current state of the vehicle have been developed. A so called semi-active damping system is, by means of some fixed restrictions, arranged to regulate the damping while the spring has a non-variable spring constant. An active damping system is arranged to regulate the damping infinitely based on the movement of the vehicle. Active damping systems may also replace stabilizers in cases where the damping torque may be regulated independently of the difference in speed between wheels and body.

JP2772155 describes a hydropneumatic damping system of a tracked vehicle wherein the damping is arranged to be controlled between two passive positions depending on vertical speed/speed difference between chassis and wheels. The damping is provided by choking an oil flow. During jumping with the vehicle in ramp-like situation this damping system results in an improved performance and comfort in that during landing the damping is controlled to a passive position with great damping while during normal drive the damping is controlled to a passive position with little damping. However, the damping system according to JP2772155 does not take for example degree of impact into consideration whereby performance only is optimized for two situations, which in certain cases may lead to bad performance and comfort.

U.S. Pat. No. 5,071,157 describes a system for controlling the suspension of a vehicle where the system measures the vertical movement of the wheels and the vertical movement of the vehicle in the corners of the vehicle. From measured values different kinds of movements of the vehicle may be detected ("heave", "roll" and "pitch"), whereupon the damping may be controlled based on the detected vehicle movements. The vehicle is provided with dampers between wheels and chassis, where the damping of the dampers may be regulated infinitely with respect to the measured values. Further measured data, such as data regarding steering angle and braking, may also be used to regulate the damping.

US20040231904 describes an active suspension system for a wheeled vehicle where the wheels are suspended by means of resilient rocker arms which selectively may be locked with a rotation damper of the respective rocker arm shaft, which is fixed to the rocker arms. Control of the respective rotation damper may be effected based upon a plurality of different signals from a torque or position sensor of the rocker arm or rocker arm shaft, etc., and aiming at obtaining the best possible capability.

The active or semi-active damping described in these and other documents increases the comfort during drive of the vehicle. There is however a need to further increase the comfort during drive of motor vehicles, and particularly there is a need of a suspension system increasing the comfort during heavy braking of a tracked vehicle.

OBJECTS OF THE INVENTION

An object of the present invention is to increase the comfort during drive of a motor vehicle.

Further objects with the invention are to improve the driving characteristics of the motor vehicle and minimize the wear on the motor vehicle to thereby extending its life.

Particularly the object of the invention is to provide increased comfort, improved driving characteristics and minimized wear during drive of tracked vehicle, and particularly during heavy braking of a tracked vehicle.

SUMMARY OF THE INVENTION

These and other objects, apparent from the following description, are achieved by a method for controlling a suspension system of a motor vehicle, such as a tracked vehicle, and a suspension system for a motor vehicle, which exhibits the features recited in the appended independent claims 1 and 9.

Further these objects are achieved by means of a motor vehicle exhibiting features described below and a computer program exhibiting features described below.

Preferred embodiments of the method and suspension system are also described below.

According to an aspect of the invention a method is provided for controlling a suspension system comprising a vehicle body and a plurality of wheel pairs, wherein the suspension system comprises spring members arranged for resilient between the wheels of the vehicle and said vehicle body. The method comprises the step of monitoring at least one first parameter indicating braking of the motor vehicle and, when said parameter indicates braking of the motor vehicle, preventing compression of the spring members of at least one wheel pair of the motor vehicle in order to prevent or at least reduce a rotation of the vehicle body in connection to the braking.

According to another aspect of the invention a suspension system for a motor vehicle is provided comprising a vehicle body and a plurality of wheel pairs. The suspension system comprises spring members arranged for resilient connection between the wheels of the vehicle and said vehicle body, suspension regulating members, and a control unit configured to control said suspension regulating members and monitor at least one first parameter indicating braking of the motor vehicle. The control unit is configured to, when said parameter indicates braking of the motor vehicle, controlling the suspension regulating member such that compression of the spring members of at least one wheel pair of the motor vehicle is prevented for counteracting a rotation of the vehicle body in connection to braking.

Advantageously compression of suspension of at least a front wheel pair of the vehicle is prevented by braking during forward drive for efficiently eliminating forward rotation of the vehicle body by braking. Correspondingly compression of suspension of at least one rear wheel pair suspension of the vehicle is advantageously prevented by braking during rearward drive for efficiently eliminating rearward rotation of the vehicle body by braking.

By monitoring at least one parameter indicating braking of the motor vehicle and preventing compression of the suspension of at least one wheel pair of the motor vehicle when the monitored parameter indicates braking of the vehicle, the rotational movements of the vehicle about an axis transvers to the vehicle efficiently be prevented or at least heavily reduced, which for example results in that the vehicle movement called "diving" may be counteracted.

The invention thus provides a type of suspension lock preventing diving by braking of a motor vehicle and thereby increasing comfort during drive of the motor vehicle. Since it prevents undesired use of the suspension of the vehicle also unnecessary wear on the spring members and other components of the suspension system, wherein the life span these components increase.

Compression of the spring members is prevented at least during a certain time period after the monitored parameter has indicated braking of the vehicle. According to an embodiment of the invention compression of the spring members is prevented by entirely preventing movement of the spring members. This may for example be provided by locking of the spring members or components coupled thereto in a certain position. The locking may be provided in any suitable way, for example through pneumatic, mechanical, electrical or electromagnetic locking of the spring members or components coupled thereto.

In order to avoid that the suspension lock prevents wheel suspension compression of the wheels during sharp irregularities on the roadway the suspension lock is preferably formed such that the compression of the at least one wheel pair is prevented only if the wheel force acting on the respective wheel from the ground in said wheel pairs is below a certain threshold value. In such a way it may be ensured that the suspension lock prevents compression of the suspension of the wheel pair during braking of the vehicle in relatively even terrain but that the suspension lock, if the terrain is so uneven that great wheel forces acts on the wheels, still permits compression of the suspension of the wheel pair in order to prevent damages on the vehicle, vehicle personnel and vehicle load.

This functionality may for example be obtained in that the suspension regulating member is configured to apply a certain locking torque or a certain locking force on the spring members or thereby connected components. By application of a locking torque or locking force is hereby intended that the spring members of components connected thereto are affected such that compression of suspension of the wheels in the wheel pair is entirely prevented by a torque or a force counteracting the wheel forces acting on the wheels from the ground.

The locking torque or locking force is suitably applied in such a way that compression of the spring members is prevented only if the wheel forces acting on the wheels in the wheel pair from the ground do not cause a counteracting torque or counteracting force exceeding said locking torque or locking force. The locking torque or locking force in that way constitutes a threshold value for the force acting on the respective wheel from the ground, wherein compression of the suspension of the wheel is only allowed if this threshold value is exceeded.

Since the at least one parameter being monitored by the control unit decides whether the above described suspension lock will be activated or not, this parameter will hereinafter be denoted activating parameter.

The activation parameter is according to an embodiment of the invention a parameter indicating the situation of a brake member of the vehicle, such as a brake pedal. In another embodiment the activation parameter is a parameter indicating a brake pressure in the vehicle. According to yet another embodiment the activation parameter indicates the retardation of the motor vehicle, which for example may be determined by means of one or more accelerometers of the vehicle.

Preferably the suspension lock is activated, which thus means that compression of the suspension of the at least one wheel pair is prevented, when the activation parameter fulfils at least on predetermined condition, hereinafter called activation condition.

The activation condition may thus be a condition for a position change of a brake member of the vehicle, a condition for brake pressure in the vehicle and/or a condition for a retardation of the vehicle.

In an embodiment of the invention when the activation parameter indicates influence of a brake member of the vehicle, such as a brake pedal, the activation condition may be that locking is effected as soon as influence of the brake member may be detected. In such a way locking of the suspension is effected immediately when the driver presses the brake pedal or in another way influences the brake member of the vehicle. If the activation parameter indicates a measured retardation of the vehicle the activation condition may, in a corresponding way, be that locking of the suspension is effected as soon as retardation of the vehicle may be detected.

In another embodiment the activation condition may be adapted such that locking of the suspension only is effected by heavy braking of the motor vehicle. This may be provided by suitable adaption of above mentioned activation conditions. When the activation parameter indicates influence of a brake member, such as a brake pedal, the activation condition may for example be that the brake member has to be affected with a speed exceeding a certain threshold value for the suspension lock to be activated. When the activation parameter indicates a measured retardation of the vehicle the activation condition may in a corresponding way be adapted such that the suspension lock is only activated if the retardation of the vehicle exceeds a certain threshold value.

Since suspension is generally desired for increased comfort the suspension lock according to the invention is advantageously formed such that it is automatically activated when it is no longer needed. This is provided in that the suspension lock is arranged to be activated when at least one condition, hereinafter called deactivation condition is fulfilled.

For this purpose the control unit may be configured to monitor at least one second parameter, hereinafter called deactivation parameter, determine whether the deactivation parameter fulfils at least one deactivation condition and deactivate said function for preventing of compression of said spring members if the deactivation condition is fulfilled.

The deactivation condition may for example be a condition for a position change of a brake member of the vehicle, a condition for brake pressure in the vehicle, a condition for retardation of the vehicle, a condition for a speed of the vehicle and/or a condition for the time that has elapsed since said function was activated.

For example the suspension lock may thereby be arranged to be activated when a driver of the motor vehicle presses the brake pedal and deactivated when the driver releases the brake pedal. According to another example the suspension lock may be arranged to be activated when a detected retardation of the vehicle exceeds a first threshold value (activation condition) in order to then be deactivated when the detected retardation falls below a second threshold value (deactivation condition). According to yet another example the deactivation parameter may be a parameter indicating the propulsion speed of the motor vehicle, wherein the suspension lock may be arranged to be automatically deactivated when the propulsion speed drops below a certain threshold value, for example corresponding to a propulsion speed of zero or close to zero km/h. According to yet another example deactivation of the suspension lock may be time controlled, such that the suspension lock is automatically deactivated a certain time after it has been activated.

According to an embodiment of the invention the motor vehicle is a tracked vehicle where the respective wheel is journalled in the vehicle body of the tracked vehicle via a damping member comprising a rocker arm arranged to carry force from the tracks of the tracked vehicle and/or wheels. The rocker arm is rotatably connected to the spring member via a bearing fixed to the vehicle body. A torque generating member is arranged to apply a damping torque to the rocker arm for damping the resilient movements of the spring member. The torque generating member in this embodiment constitutes above mention suspension regulating members which, by applying a great torque constituting locking torque on said rocker arm, may prevent compression of the suspension of the at least one wheel pair by braking of the tracked vehicle. According to an embodiment the torque generating member comprises a lamella package generating friction force when it is pressurised by a pressuring member, wherein the friction force prevents rotation of the rocker arm and the spring member connected thereto. In such a way the locking torque may be applied through pressurising of the lamella package. By controlling said lamella pressure the friction force that needs to be overcome by the rotational torque of the rocker arm for obtaining compression of the suspension of the wheels further be regulated such that wheel suspension compression is prevented until the wheel force exceeds a desired value.

According to another aspect of the invention a motor vehicle, such as a tracked vehicle is provided, comprising above described suspension system.

The above described method is preferably computer implemented, which means that the control unit is caused to perform the above described functions by execution of a computer program. The control unit may therefore comprise a digital, non-volatile storage medium storing said computer program, and a processor for executing said computer program.

Thus, according to an additional aspect of the invention, a computer program for controlling a suspension system of a motor vehicle comprising a vehicle body and a plurality of wheel pair, where the suspension system comprises spring members arranged for resilient connection between the wheels of the vehicle and said vehicle body, suspension regulating members, and a control unit for controlling the suspension regulating member, wherein the computer program, when executed by a processor in said control unit, causes the control unit to perform the above described method.

BRIEF DESCRIPTION OF THE DRAWINGS

The present invention will be better understood with the reference to the following detailed description when read in conjunction with the accompanying drawings, wherein like reference characters refer to like parts throughout the several views, and in which:

FIG. 5b schematically shows a detail of the part in FIG. 5a;

DESCRIPTION OF EMBODIMENTS

Hereinafter the term "link" refers to a communication link which may be a physical connector, such as an optoelectronic communication wire, or a non-physical connector such as a wireless connection, for example a radio or microwave link.

Figure 1:
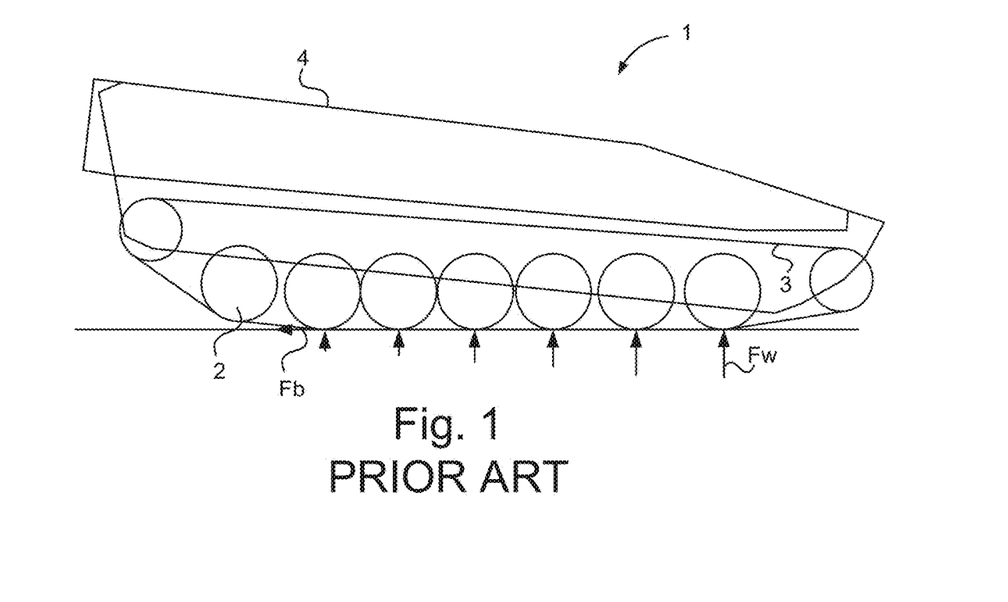
FIG. 1 shows a motor vehicle in the form of a tracked vehicle according to prior art, during a brake manoeuvre.
Figure 2:
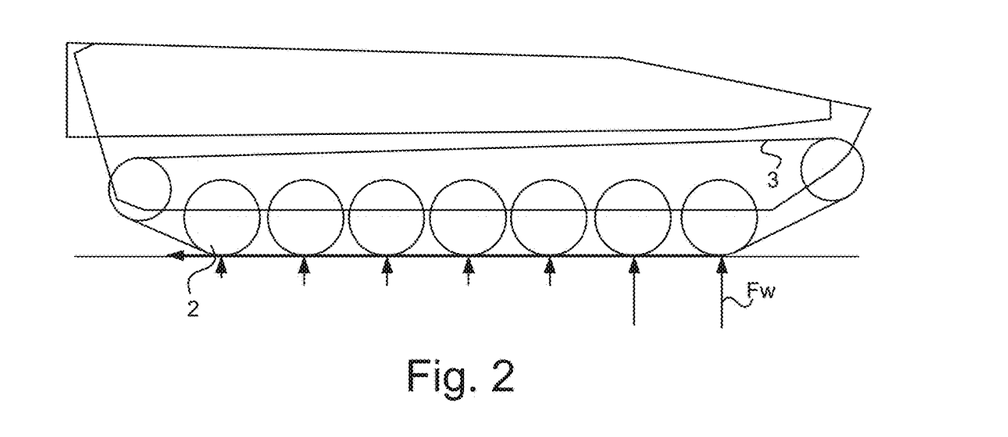
FIG. 2 shows a motor vehicle in the form of a tracked vehicle according to an embodiment of the present invention; during a brake manoeuvre.

FIGS. 1 and 2 schematically shows a side view of a motor vehicle 1. The exemplified vehicle 1 is constituted by a tracked vehicle such as a military tracked vehicle comprising a plurality of wheels 2 and a propulsion track 3 running around the wheels for driving of the vehicle. Further the vehicle 1 comprises a vehicle body 4, which includes the chassis of the vehicle and bodywork. Even if the illustrated motor vehicle 1 is a tracked vehicle the motor vehicle 1 may according to other embodiments of the invention by constituted by wheeled vehicles.

FIG. 1 shows the motor vehicle during a conventional braking manoeuvre. When the tracked vehicle brakes the front part of the vehicle dives and the rear part lifts somewhat. This depends on the centre of gravity of the vehicle lying at a distance above the roadway and that the brake force, denoted Fb in the figure, acts on the vehicle at the roadway. In order to balance the torque arising the vehicle dives, the springs in the front part of the vehicle being compressed and the wheel forces on the front wheels, denoted Fw in the figure, increase. In the rear part of the vehicle the spring forces and the wheel forces are reduced. The diving increases until torque equilibrium is obtained.

FIG. 2 shows a motor vehicle during corresponding braking manoeuvre when the vehicles 1 is equipped with a suspension system according to the present invention for preventing or at least reducing said diving movement, which suspension system will be described in the following.

Figure 3A:
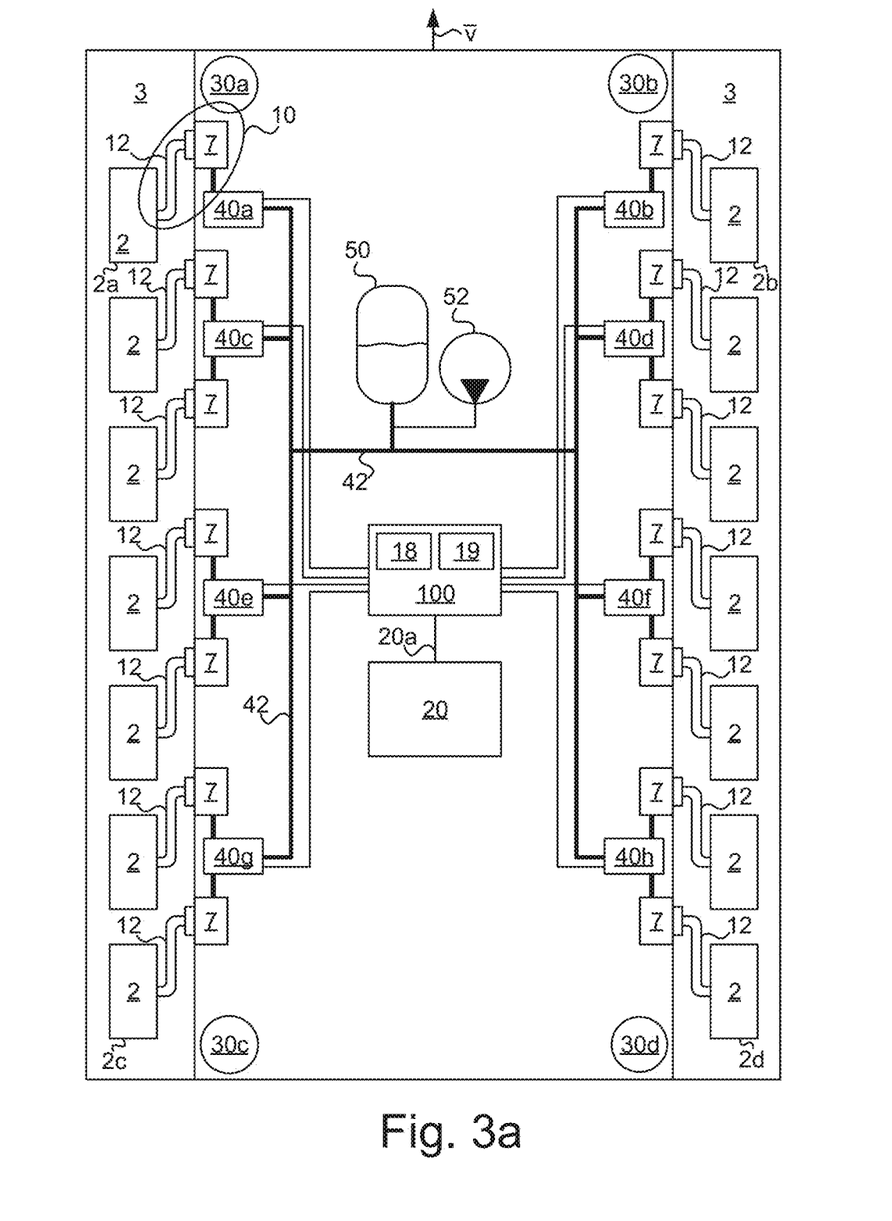
FIG. 3a schematically shows parts of a suspension system of the motor vehicle, according to an embodiment of the invention.
Figure 3B:
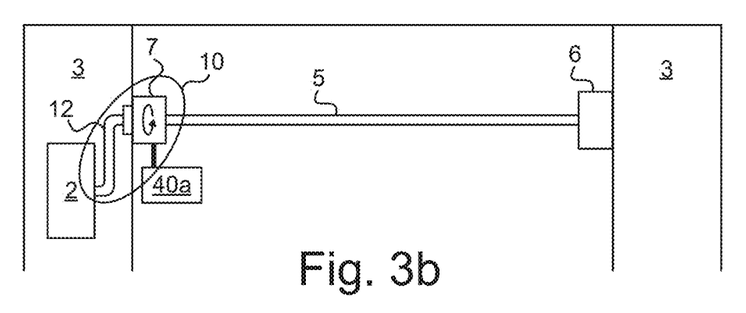
FIG. 3b schematically shows other parts of said suspension system.
Figure 3C:
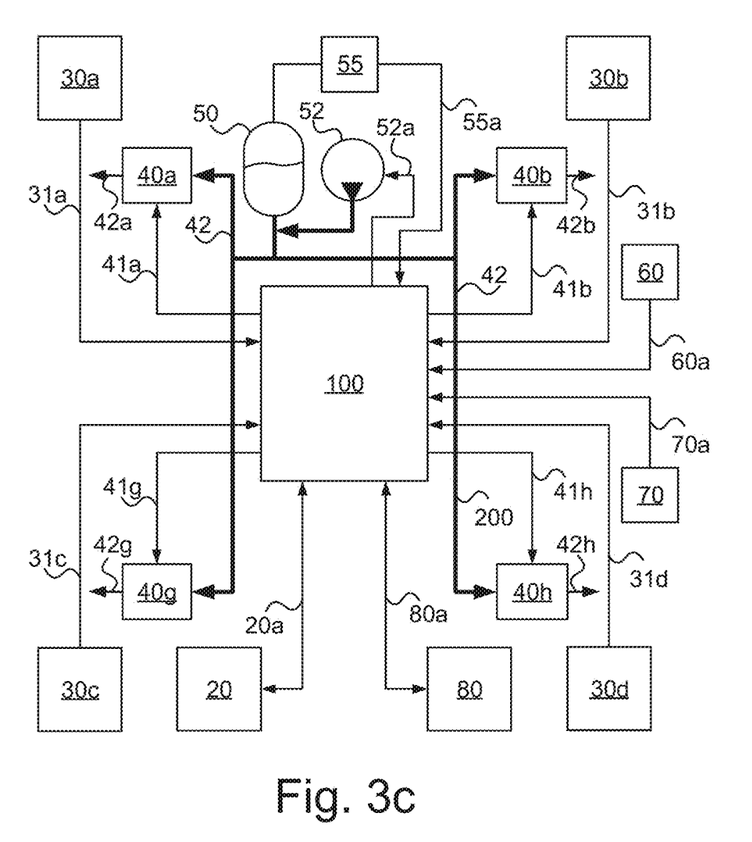
FIG. 3c schematically shows a control system for the suspension system in FIGS. 3a and 3b, according to an embodiment of the invention.

FIG. 3 schematically shows a top view of the vehicle 1 in FIG. 2, comprising a suspension system according to an embodiment of the present invention. FIG. 3b discloses further components of the suspension system which for reasons of space are not shown in FIG. 3a. FIG. 3c schematically show a control system for the suspension system in FIGS. 3a and 3b. The motor vehicle 1 and its suspension system will now be described with contemporary reference to FIGS. 2 and 3a-c.

The motor vehicle 1 comprises shock-absorbing members in the form of propulsion tracks 3 arranged on the respective side of the vehicle, and wheels 2 arranged on the respective side of the vehicle around which the respective propulsion track 3 runs. The wheels indicated with reference numbers 2a and 2b constitute a front wheel pair of the tracked vehicle and the wheels indicated with reference numbers 2c and 2d constitute a rear wheel pair of the tracked vehicle. The suspension system of the motor vehicle 1 comprises a plurality of spring members 5, of which only one is shown in FIG. 3b. The spring members 5 create a resilient connection between the respective wheel 2 of the vehicle body 4. The spring member 5 for the respective wheel 2 is in this embodiment constituted by a torsion spring of steel, which in one end is connected to the wheel 2 via a damping member 10 and in the other end is rotation locked to the vehicle body 4 via a splined joint 6.

The damping member 10 constitutes a part of a damping system of the suspension system which aims at damping resilient movements occurring between the wheels 2 and the vehicle body 4. The damping member 10 comprises in this embodiment a rocker arm 12, one end of which is pivotably journalled in a torque generating part 7, which is fixedly anchored in the vehicle body 4, and the other end of which supports a wheel axle spindle for rotatable journaling of a hub of said wheel 2.

The damping system further comprises a pressurising member 40a-40h for pressurising the damping members 10 and thereby affect its damping characteristics based on, among others, movements of the motor vehicle 1. These pressurising members 40a-40h are according to an embodiment constituted by valve devices comprising pressure reducing valves. Each pressurising member 40a-40h controls the damping pressure of one or more damping members 10 and in the exemplified embodiment shown in FIG. 3a each pressurising member 40a-40h is arranged to control the damping pressure of one or more adjacent damping members 10.

Further the damping system comprises pressure supplying means arranged to pressure supply said pressurising members 40a-40h. The pressure supplying means comprises an accumulator 50 pressure supplying said pressurising members 40a-40h via conduits 42 for transport of oil. The pressure supplying means further comprises a hydraulic pump 52 connected to the accumulator 50 and arranged to regulate the pressure in the accumulator 50. For example the hydraulic pump 52 may be arranged to regulate the pressure in the accumulator 50 based on pressure data obtained from a pressure sensor 55 measuring current pressure in the accumulator 50, for securing that the accumulator pressure does not fall below a certain minimum pressure. In a preferred embodiment said pressure regulation is provided by means of a hydraulic system of the motor vehicle 1.

Further the suspension system comprises a control system schematically shown in FIG. 3c. The control system is arranged to control the suspension characteristics by regulating above described damping system. The control system comprises means for continuously determining the movement of the vehicle 1 with respect to the gravity field of the earth. In an embodiment said movement determination means comprises a multi-axle inertia sensor member 20 and a plurality of accelerometers 30a-30d, each being arranged in a respective corner portion of the vehicle 1.

The control system further comprises brake sensor means 60 for sensing braking of the vehicle 1. The brake sensor means comprises according to an embodiment sensor members for measuring the position of a brake member of the vehicle, such as the position of a brake pedal. The brake sensor means 60 may also comprise sensor members for measuring brake pressure of the vehicle 1.

The control system further comprises steering angle sensor means 70 for sensing steering angle of the vehicle 1.

The main component in the control system is an electronic control unit 100 which via links 21, 31a-31d is connected to the movement determination means 20, 30a-30d. The electronic control unit 100 is configured to receive signal from the movement determination means 20, 30a-30d representing the movement of the vehicle relative to the gravity field of the earth and, based on said signals, determining the vertical speed of the vehicle 1.

According to a preferred embodiment the electronic control unit 100 is configured to continuously calculate the vertical speed in the area for the respective corner portion of the vehicle 1, which may be done based on the signals from the respective accelerometer 30a-30d.

According to an embodiment the electronic control unit 100 is further configured to low pass and high pass filter and drift compensate the calculated vertical speeds.

The electronic control unit 100 is further configured to calculate desired damping torque for the respective damping member 10 based on the calculated vertical speeds. This calculation is according to an embodiment provided by a modified "sky hook" algorithm, which means that the control unit 100 is configured to calculate a damping torque for the respective damping member 10 based on vertical speed of the vehicle body, where the damping torque is not linear to the vertical speed.

The electronic control unit 100 is further configured to calculate required pressure for the respective damping member 10 based on said calculated damping torque, and control the above described pressurising members 40a, 40h to apply the thereby calculated pressures on the respective damping member 10 for obtaining desired damping on the respective wheel 2 of the vehicle 1. For the purpose of making FIG. 3C more lucid only the pressurising members 40a-40b, 40g-40h of the front and rear wheel pair of the vehicle are shown here. It is however to be understood that other or all pressurising members 40a-40h being shown in FIG. 3a may be controlled in a corresponding way.

In the exemplified embodiment the control unit 100 is connected via links 41a-41b, 41g-41h to the different pressurising members 40a-40b, 40g-40h and configured to send a signal representing pressurising data for the respective damping member 10 to the respective pressurising member. The pressurising members 40a-40b, 40g-40h are in turn configured to pressurise one or more adjacent damping members 10 with pressure indicated by said pressurising data by opening such that the pressure medium, which in this case is oil from the accumulator 50, pressurises the damping members 10 via the conduits 42, 42a-42b, 42g-42h such that the calculated damping torques are obtained in the respective damping member 10.

The electronic control unit 100 is suitably also configured to control the pressurising of the pressure supply member 55 via a link 55a, and connected to the, with the accumulator 50 connected, hydraulic pump 52 via a link 52a. The electronic control unit 100 is via the link 55a arranged to receive signals from the pressure sensor member 55 representing accumulator pressure data and control the hydraulic pump 52 by sending control signals to the hydraulic pump via the link 52a based on received accumulator pressure data. Hereby the pressure in the accumulator 50 may be held on a required level for pressurising of the damping members 10 to be accomplished.

The electronic control unit 100 is further connected to said brake sensor means 60 via a link 60a in order to via the link receive signals from said brake sensor means 60 representing brake member position data and/or brake pressure.

The electronic control unit 100 is further connected to said steering angle sensor means 70 via a link 70a in order to via the link receive signals from said control sensor means 70 representing steering angle data.

The electronic control unit 100 is further connected to said movement determination means 20, 30a-30d via links 20a, 31a-31d in order to via the links receive signals from the movement determination means 20, 30a-30d representing the movement of the vehicle 1 relative to the gravity field of the earth. In addition to calculating the vertical speed as described above the control unit 100 is configured to, based on the signals from the movement determination means 20, 30a-30d continuously calculate the direction of movement of the vehicle, speed and acceleration of the vehicle. In addition to the signals from the movement determination means 20, 30a-30d the control unit 100 may be configured to receive signals representing the gear position of the engine of the vehicle and use the information relating to the gear position in the determination of the direction of movement of the vehicle and/or speed of the vehicle. In order to calculate the acceleration of the vehicles in different directions, for example the lateral acceleration of the vehicle body, the control unit 100 advantageously uses the information from the movement determination means 20, 30a-30d. The control unit may however be configured to calculate acceleration based on other available information. For example the lateral acceleration of the vehicle bodywork is calculated by the control unit 100 based on received signals representing steering angle and current vehicle speed.

Based on the signals from the movement determination means 20, 30a-30d, the brake sensor means 60 and steering angle sensor means 70 the electronic control unit 100 is configured to calculate desired damping torque for the respective damping member 10 and provide said damping torque in a way as described above.

For example the control unit 100 may be configured to:

Increase the damping torque for the damping members in the front part of the vehicle, for example the damping members belonging to the front wheel pair 2a/2b, when signals from the movement determination means 20, 30a-30d indicate that the vehicle is moving forward, and/or increase the damping torque for damping members 10 in the rear part, for example the damping members belonging to the rear wheel pair 2c/2d when these signals indicate that the vehicle is moving rearwardly;

Increase the damping torque on damping members 10 in the front part of the vehicle, for example the damping members belonging to the front wheel pair 2a-2b, when the signals from the brake sensor means 60 and the movement determination means 20, 30a-30d indicate that the bodywork of the vehicle 1 has received a forward rotation as a consequence of a retardation (braking) when the vehicle is moving in the forward direction of the vehicle;

Increase damping torque on the damping members 10 in the rearward part of the vehicle when signals from the movement determination means 20, 30a-30d indicate that the vehicle accelerate in the forward direction of the vehicle;

Increase the damping torque on the damping members 10 on one side of the vehicle, when signals from the movement determination means 20, 30a-30d and/or signals from the steering angle sensor means 70 indicates that the vehicle body 4 of the vehicle 1 is healing or should heal towards said side.

Further the electronic control unit 100 is connected to an interface 80 via a link 80a. The interface is according to an embodiment constituted by a control panel from which the driver of the motor vehicle 1 may request desired suspension characteristics in the form of selectable damping modes. The selectable damping odes may for example by damping modes which have been predefined for being adapted to propulsion of the vehicle during normal conditions, high-road conditions, or conditions with uneven terrain. In a preferred embodiment the interface 80 may comprise a switch by means of which request of diving damping may be activated and deactivated. The function for diving damping will be described in more detail below. Further the interface may comprise a switch by means of which request about healing damping may be activated and deactivated. The electronic control unit 100 is arranged to receive signals from said interface 80 representing suspension characteristics selectable for the driver, such as said selectable damping modes, wherein the control unit 100 is arranged to calculate desired damping torque for the respective damping member 10 based on selected suspension characteristics and previously given input signals to the control unit 100.

The electronic control unit 100 comprises a processor 18 and a digital non-volatile storage medium 19 in which a computer program for controlling the suspension system is stored. It is the computer program which, when executed by the processor 18, causes the control unit 100 to perform all the functions described herein.

Figure 4A:
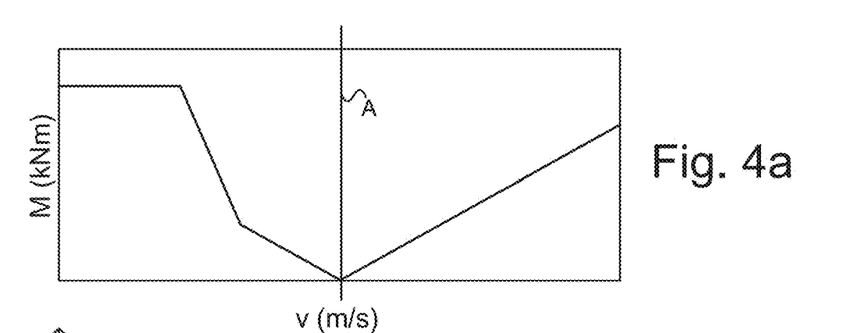
FIG. 4a shows an example of how damping in the suspension system may be controlled based on detected vertical speed of the vehicle.

FIG. 4a schematically shows how the control unit 100 may be arranged to control the damping of the suspension system of the motor vehicle 1. In the example in FIG. 4a the damping control is adapted for damping during landing after driving in ramp, that is when the motor vehicle 1 or at least its front portion falls back towards the ground after having been air borne.

The curve in FIG. 4a shows damping torque in dependence of the vertical speed of the vehicle 1, that is the vertical speed of the vehicle body 4. The damping torque is in this embodiment determined entirely based on the vertical speed such that a certain determined vertical speed results in a certain applied damping torque.

The part of the curve left of the dotted line A indicates falling speed of the vehicle body 4 of the vehicle 1 and the part of the curve right of the dotted line A indicates the rising speed of the vehicle body 4 of the vehicle 1. As is apparent from the curve the damping torque increases with increasing falling speed linearly to a certain value of the falling speed. When the falling speed exceeds this value the damping torque increases quicker until a maximum damping torque has been obtained, wherein the maximum damping torque is maintained even if the falling speed increases further in order to avoid overload of the wheel support station or its fixation to the vehicle body.

At increasing rising speed the damping torque always increases linearly. Since the rising speed cannot be endlessly high, the rising speed in normal cases only increases during a very short period of time, no upper limit is needed for applied damping torque by increasing rising speed.

In this embodiment the electronic control unit 100 is configured to control the suspension system of the motor vehicle by applying a predetermined damping torque on the damping members 10 based on the vertical speed of the vehicle body 4. Suitably the control unit is configured to apply a damping torque on a number of or all wheels 2 of the vehicle, wherein the damping torque on the respective wheel 2 is based on the vertical speed of the area of the vehicle body 4 by with which the respective wheel is connected. The vertical speed of certain areas of the vehicle body may either be measured directly by means of the accelerometers 30a-30d located in the respective corner portion of the vehicle body 4 or be calculated based on measured data from said accelerometers and knowledge of the relative placement of the accelerometers.

Figure 4B:
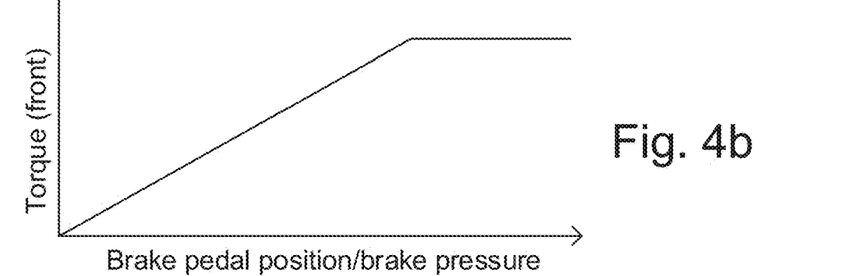
FIGS. 4b and 4c schematically show examples of how damping in the suspension system may be controlled for reducing rotational movements of the vehicle by braking of the vehicle when the vehicle moves in forward direction and rearward direction respectively.
Figure 4C:
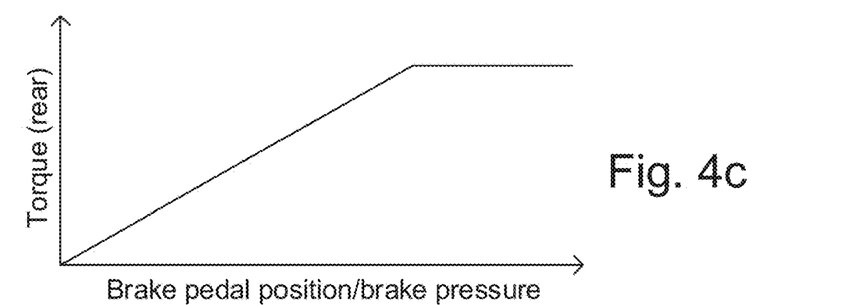

FIGS. 4b and 4c schematically show how the control unit 100 may be arranged to control the damping of the suspension system of the motor vehicle for damping of diving movements during braking of the vehicle 1. FIG. 4b shows how applied damping torque on the front wheel pair 2a-2b of the vehicle may be controlled based on brake pedal position and/or brake pressure during drive forward and FIG. 4c shows how applied damping torque on the rear wheel pair 2c-3d of the vehicle may be controlled based on brake pedal position and/or brake pressure during drive rearwardly. Below a specific function for preventing diving movement by braking of the vehicle 1 will be described. It is to be noted the damping of diving movements shown in FIGS. 4b and 4c are examples on how certain diving damping may be obtained even when this later described function is not activated.

Figure 4D:
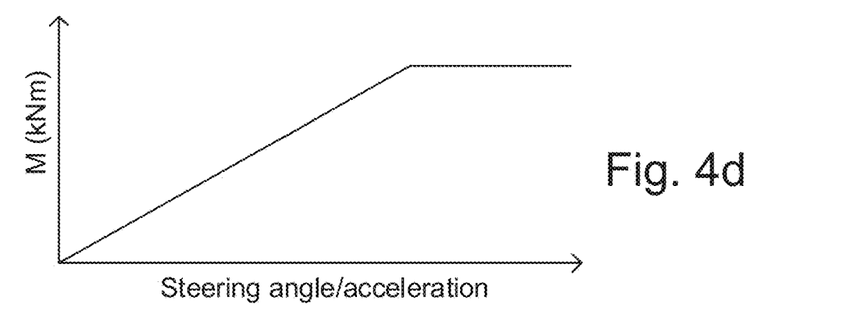
FIG. 4d shows an example of how damping in the suspension system may be controlled for reducing heeling movements of the vehicle.

FIG. 4d schematically shows how the control unit 100 may be arranged to control the damping of the suspension system of the motor vehicle for damping of healing of the vehicle.

Figure 5A:
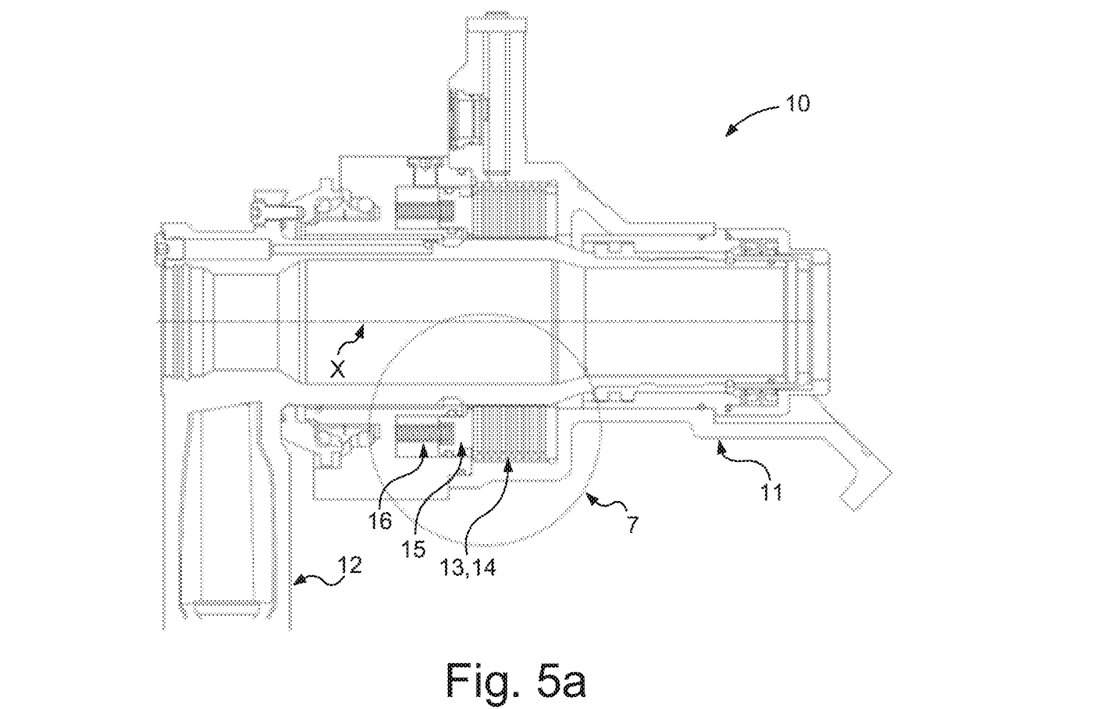
FIG. 5a schematically shows a part of a damping member according to an embodiment of the invention.
Figure 5B:
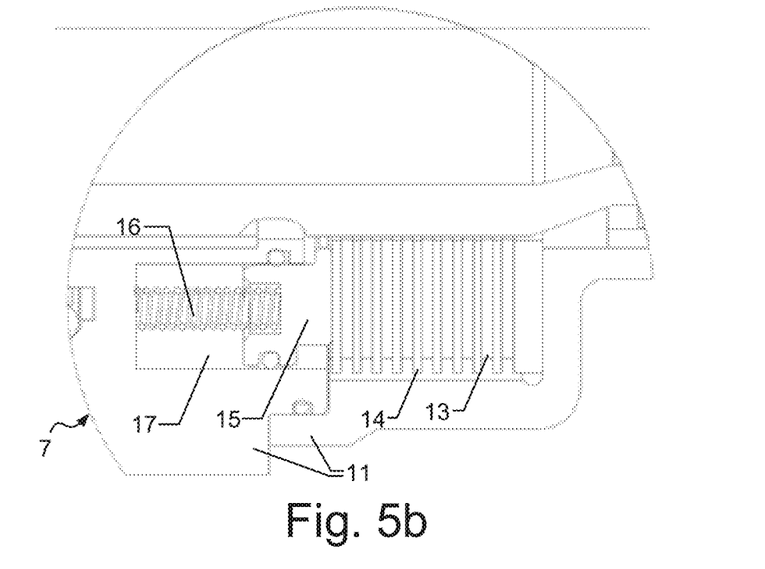

FIG. 5a schematically illustrates a part of a damping member 10 according to an embodiment of the present invention. FIG. 5b illustrates parts of the damping member in FIG. 5a in more detail.

The damping member 10 comprises a housing 11 being fixedly connected to the vehicle body 4 and more specifically the chassis of the vehicle. Further the damping member comprises a rocker arm 12 arranged to receive force from shock-absorbing members such as the propulsion tracks 3 and/or the wheels 2, and a torque generating member 7, wherein the rocker arm 12 is journalled in the torque generating member at one of its ends.

Said torque generating member 7 comprises a lamella package comprising lamellas 13 and stator discs 14, which are arranged for generation of a friction force when these are pressurised and pressed together by a piston 15. The piston 15 thus aims at applying a normal force over said lamella package for generating said friction force.

The stator discs 14 are fixedly anchored in the housing 11 and the lamellas 13 are fixedly anchored to an axle X of the rocker arm 12, which axle X is rotatably journalled in the housing 11.

The piston 15 is typically constituted by a piston ring being arranged in the housing 11 in connection to the lamella package such that, by pressurisation on one side of the piston 15, a normal force is created over the lamella package. The normal force compresses the lamella package such that the friction force being created in the lamella package by rotation of the rocker arm 12 damps the rotation movement with a damping torque being proportional to the applied pressure. The pressure is provided a described above by means of the pressurising members 40a-40h.

The damping member 10 further comprises an application spring 16 arranged in connection to the piston 15 to prevent gap formation.

Pressurising of the position 15 is according to this embodiment provided by means of oil being delivered via the pressurising members 40a-40h and introduced in a space 17 in connection to the spring 15, wherein the pressurised oil exerts a force on the piston 15 such that said damping torque occurs.

An advantage with the torque generating member 7 according to the invention is that small pressure increases gives a large friction increase in the lamella package, which in turn results in large increase of the damping torque. Thereby quick regulation of the damping torque is obtained such that the suspension system quickly can respond to the detected vehicle movements and adapt the suspension system accordingly.

Function for Damping of Diving Movement by Braking

As described above with reference to FIGS. 4b and 4c the suspension system may according to an embodiment of the invention be designed for damping diving movements of the motor vehicle 1 by controlling applied damping torque on at least the front wheel pair 2a/2b of the vehicle (during forward drive) or rear wheel pair 2c/2d (during reversing) based on a monitored parameter indicating braking of the vehicle, such as brake member position or brake pressure. According to given example the damping torque is controlled such that it increases linearly with increased change of position of the brake member and/or increased brake pressure.

Advantageously the suspension system according to the invention is also designed to provide a function through which compression of the suspension of at least one wheel pair entirely is prevented when the monitored parameter indicates braking of the vehicle, at least as long as the wheel pressure on the wheels in said wheel pair is below a certain threshold value. In order to simplify the description of this functionality hereinafter it will be assumed that the vehicle 1 moves in the forward direction of the vehicle and that the suspension system is configured to prevent compression of the suspension of only the front wheel pair 2a/2b by braking. It shall however be understood that the functionality is advantageous by both forward and rearward drive and may be used to prevent compression of the suspension of one, or a number or all wheel pairs of the vehicle 1.

The above described functionality is provided by means of a suspension regulating member for controlling the suspension of the front wheel pair 2a/2b of the vehicle 1. The control unit 100 is configured to monitor at least one parameter indicating braking of the vehicle, hereinafter called activation parameter. The activation parameter may be a parameter being obtained from the above described brake sensor means 60 and represents brake member position data and/or brake pressure and/or a parameter being obtained from the above described movement determination means 20, 30a-30d and represent a retardation of the vehicle 1 in the direction of movement of the vehicle. Further the control unit 100 is configured to, when said activation parameter indicates braking of the motor vehicle, control the suspension regulating member such that compression of the suspension of the front wheel pair is entirely prevented, to thereby prevent a forward rotation of the vehicle body 4 at the braking occasion and thereby minimize the so called diving movement occurring in the vehicle 1 by braking. It should be noted that at certain diving movement may occur by braking despite that compression of the suspension of the front wheel pair 2a/2b is entirely prevented due to the rear portion of the vehicle being somewhat raised at the braking occasion. This diving movement is however substantially smaller than the diving movement that would arise if a normal damped compression of the suspension of the front wheels would be allowed.

The suspension regulating member preventing compression of the suspension of the wheels by braking may be designed in many different ways depending on vehicle type and suspension system. In the exemplified embodiment described above the suspension regulating member is constituted by the toque generating member 7, which may be controlled by the control unit 100 to apply maximum damping torque as soon as the activation parameter indicates braking of the vehicle 1. According to this embodiment the suspension regulating member 7 is thus configured to prevent compression of the suspension of the at least front wheel pair 2a/2b by applying a locking torque or a locking force on the rocker arms 12 belonging to the wheels 2a, 2b in said wheel pair, which in turn prevents compression of the spring members 5 coupled to the rocker arms. Even if wheel suspension compression in this embodiment thus is prevented by indirectly locking the spring members 5 by pressurising of damping members 10 coupled to the respective spring member 5 it is to be understood that suspension locking in other types of suspension systems may be provided in other ways, for example through pneumatic, mechanic or electric locking of spring members or thereto coupled components.

The suspension system according to the intention is thus configured to provide a type of suspension lock for preventing or at least reducing diving movements. The suspension lock may advantageously, such as described above, be activated and deactivated via the interface 80 available for the driver of the vehicle.

In order to avoid that the suspension lock prevents compression of the suspension of the wheels by sharp irregularities the spring lock is preferably designed such that the compression of the suspension of the wheel pair is only prevented as long as the force acting on the respective wheel in said wheel pairs from the ground falls below a certain threshold value. In such a way it can be secured that the spring lock prevents compression of the suspension of the front wheel pair during braking of the motor vehicle when the force on the wheels form the ground is not too big, while compression of the suspension of the front wheel pair is admitted in the event of a very large force being applied on the wheels from the roadway, as is the case for example when the wheels lands after having been air born or are subjected to heavy impact from irregularities in the roadway.

This functionality may be provided by, in a suitable way, applying a locking torque or a locking force on the spring members of the wheels or thereby coupled components. This results in compression of the suspension of the wheels being prevented as long as the force acting on the respective wheel from the ground does not cause an oppositely directed force or an oppositely directed torque exceeding the applied locking torque or locking force. The locking torque or locking force constitute in such a way a threshold value for the force acting on the respective wheel from the ground, wherein compression of the suspension of the wheel only occurs if the threshold value is exceeded. It should be noted that the application of a locking torque or a locking force not necessarily means that a locking torque or a locking force immediately arises. Instead application of a locking torque or a locking force, as in the above described embodiment, may mean pressurising or other influence of a member being directly or indirectly coupled to a spring member for the purpose of, when the spring member or a member coupled thereto are subjected to a wheel force which acts from the ground on a wheel coupled to the spring member, creating a torque (locking torque) or a force (locking force) which counteracts the wheel force and thereby prevents compression of suspension of said wheels.

In order to avoid unnecessary locking of the suspension the suspension lock is preferably designed such that it is automatically deactivated when it is no longer considered to be needed. This functionality is provided in that the control unit 100 is configured to continuously control whether at least on deactivation condition is fulfilled and control the suspension regulating member 7 to remove the applied locking torque or locking force when the deactivation condition is fulfilled.

The deactivation condition is a condition for a parameter monitored by the control unit 100, hereinafter called deactivation parameter. For example the deactivation parameter may be a parameter being obtained from above described brake sensor means 60 and represents brake member position data and/or brake pressure and/or a parameter being obtained from above described movement determination means 20, 30a-30d and represents a retardation of the vehicle 1 in the direction of movement of the vehicle. The activation parameter may be the same parameter or another parameter than the above described activation parameter.

For example the deactivation parameter may thus be a parameter indicating influence of a brake member of a vehicle, such as a brake pedal, wherein deactivation of the suspension lock may be effected when the brake member no longer is affected. Thereby the control unit 100 may be configured to activate the suspension lock when a driver of the vehicle 1 presses on a brake pedal of the vehicle and to deactivate the suspension lock when the driver releases the brake pedal.

According to another example the deactivation condition may be the retardation of the vehicle, such as indicated by the deactivation parameter, falling below a certain threshold value, which in turn indicates that the instantaneous braking is no longer so heavy. Thereby The control unit 100 may be configured to activate the suspension lock when a detected retardation of the vehicle exceeds a first threshold value (activation condition) and deactivate the suspension lock when the detected retardation falls below a second threshold value (deactivation condition).

In another embodiment the deactivation parameter may be a parameter indicating the current speed of the motor vehicle, wherein the control unit 100 may be configured to deactivate the suspension lock when the speed falls below a certain threshold value, for example when the speed of the vehicle is zero or close to zero km/h.

According to another embodiment of the present invention the control nit 100 may be configured to deactivate the suspension lock when a certain time has elapsed since the suspension lock was activated.

Figure 6A:
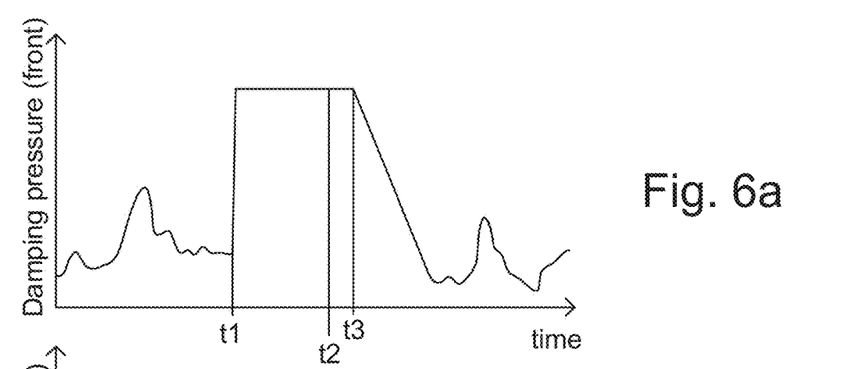
FIGS. 6a and 6b show examples of how the suspension lock according to an embodiment of the invention may function by manoeuvring of the motor vehicle.
Figure 6B:
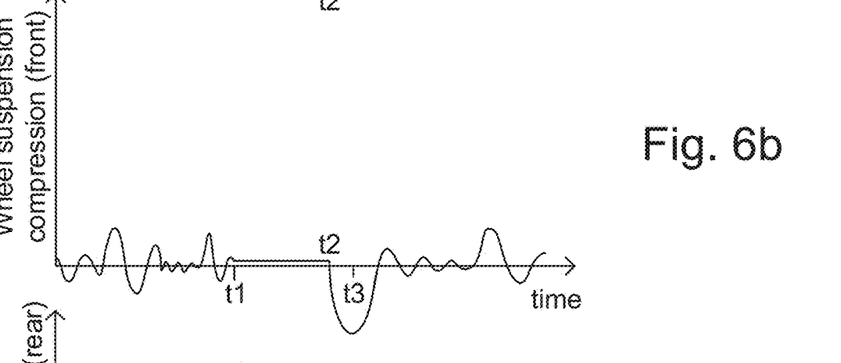

FIGS. 6a and 6b show an example of how the suspension lock may function when it is implemented in the above described embodiment of the suspension system of the tracked vehicle 1. As mentioned above the suspension regulating member in this embodiment is constituted by the torque generating member 7, which is controlled by the control unit 100 to activate the suspension lock by, via pressurisation of the torque generating member 7, applying a locking torque on the rocker arm 12 and thereby the spring member 5 connected to the rocker arm.

FIGS. 6a and 6b show the damping pressure controlling applied damping torque and compression of suspension of one of the front wheels 2a, 2b of the vehicle in a fictitious situation when the vehicle 1 is driven forwardly in a relatively even terrain before a point of time t1, makes a heavy braking at the point of time t1 facing a passage of a ditch, hits the bottom of the ditch with said front wheels at a point of time t2 and continue to drive in the relatively even terrain after the point of time t2.

At the point of time t1 when the driver makes a braking action of the vehicle 1 an activation condition is fulfilled for the suspension lock wherein the suspension lock is activated by heavy pressurisation of the torque generating member 7 for applying a damping torque constituting a locking torque on the rocker arm 12 and the spring member 5 connected thereto. In this embodiment the control unit 100 is configured to control the damping pressure such that the applied locking torque corresponds to the maximum torque that may be provided by the torque generating member 7, which for example may correspond to 15 kNm. The locking torque should be sufficiently high to entirely prevent compression of the suspension of the wheel, at least by driving in a relatively even terrain, in order to thereby minimize diving movement of the vehicle by the braking. For the exemplified vehicle type and set of wheels the locking torque should be at least 5 kNm, more preferably at least 10 kNm and most preferably 15 kNm or more. The increasing wheel force when the wheel hits the bottom of the ditch at the point of time t2 results in the torque acting on the torque generating member 7 via the rocker arm 12 exceeds the locking torque, wherein the lamellas 13 in the torque generating member 7 starts sliding and compression of the suspension of the wheel occurs despite the fact that the suspension lock still is active. At a subsequent point of time t3 a deactivation condition is fulfilled for the suspension lock, wherein the control unit 100 lowers the damping pressure in the torque generation member 7 such that the applied locking torque is removed. Thereafter the torque generation member 7 is controlled according to principles described earlier for optimizing the suspension system based on the movements of the vehicle.

Figure 7A:
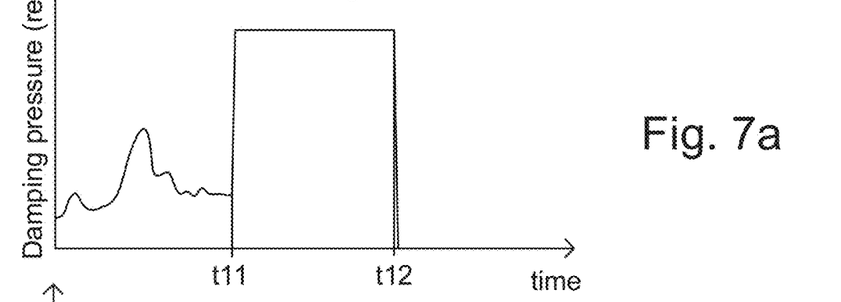
FIGS. 7a and 7b show another example of how the suspension lock according to an embodiment of the invention may function by manoeuvring of the vehicle.
Figure 7B:
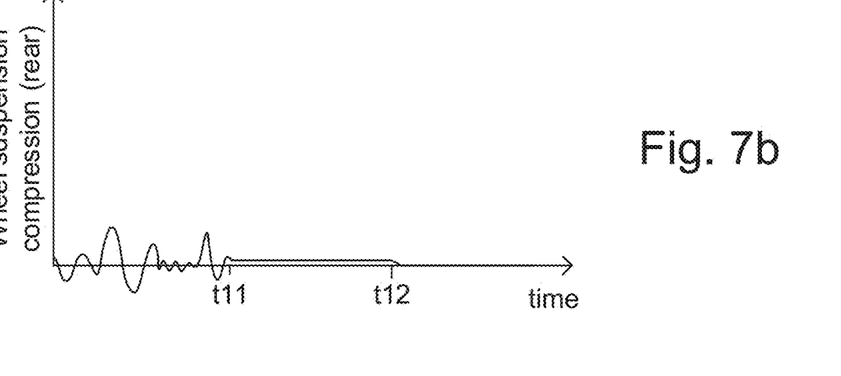

FIGS. 7a and 7b show another example of how the suspension lock may function when it is implemented in the above described embodiment of the suspension system of the tracked vehicle.

FIGS. 7a and 7b show the damping pressure controlling applied damping torque and compression of the suspension of one of the front wheels 2a-2b of the vehicle in a fictitious situation when the vehicle 1 is driven forwardly in even terrain prior to a point of time t11 when the driver starts braking of the vehicle 1 to completely stop the vehicle at a subsequent point of time t12. At the point of time t11 an activation condition for the suspension lock is fulfilled wherein the suspension lock is activated and a damping torque constituting locking torque is applied on the rocker arm 12 and the spring member 5 thereby rotational connected by pressuring of the torque generating member 7. As mentioned above the activation condition may for example be a certain position change of a brake member of the vehicle or a certain retardation of the vehicle. The suspension lock prevents compression of the suspension of the current wheel and the wheel forces acting on the wheel from the ground do not lead to any oppositely directed torque exceeding the applied locking torque, wherein compression of the suspension of the wheel entirely is prevented until the vehicle stands entirely still or almost entirely still at the point of time t12. At the point of time t12 a deactivation condition is fulfilled for the suspension lock, for example that the suspension lock no longer is affected or no longer is affected to any greater extent, that the retardation of the vehicle entirely stops or falls below a certain threshold value or that the speed of the vehicle is zero or close to zero, wherein the suspension lock is activated by reducing the damping pressure in the torque generation member 7.

In the above described embodiment the suspension regulating member is constituted by a torque generating member of the damping member 10. In the torque generation member 7 a damping torque is created, which in the exemplified embodiment of the invention also constitutes locking torque, by pressurisation of a friction generating lamella package. It should be understood that this damping torque may be created in many other ways.

According to a variant an electric machine may be used as torque generating member. The electric machine may then comprise a rotor and a stator, where the rotor is connected to the rocker arm 12 and the stator with the vehicle body 4. The damping torque may then be controlled by varying the current through the electric machine. The electric machine may be constituted by any suitable type of electric machine, such as a permanent magnet motor, an asynchronous motor or a reluctance motor.

According to another variant a linear damper may be used to create a locking force preventing compression of the suspension of the wheels. The linear damper may be connected between rocker arm 12 and vehicle body 4. According to a variant the linear damper may be constituted by a linear oil damper with variable pressure limiting valve. The pressure limiting valve comprises according to a variant a valve plug sprung by a spring, wherein the spring is arranged to be biased by means of for example a solenoid. The damping force may be controlled by varying the current through the coil of the solenoid such that the magnetic core changes bias force to the spring.

Figure 8:
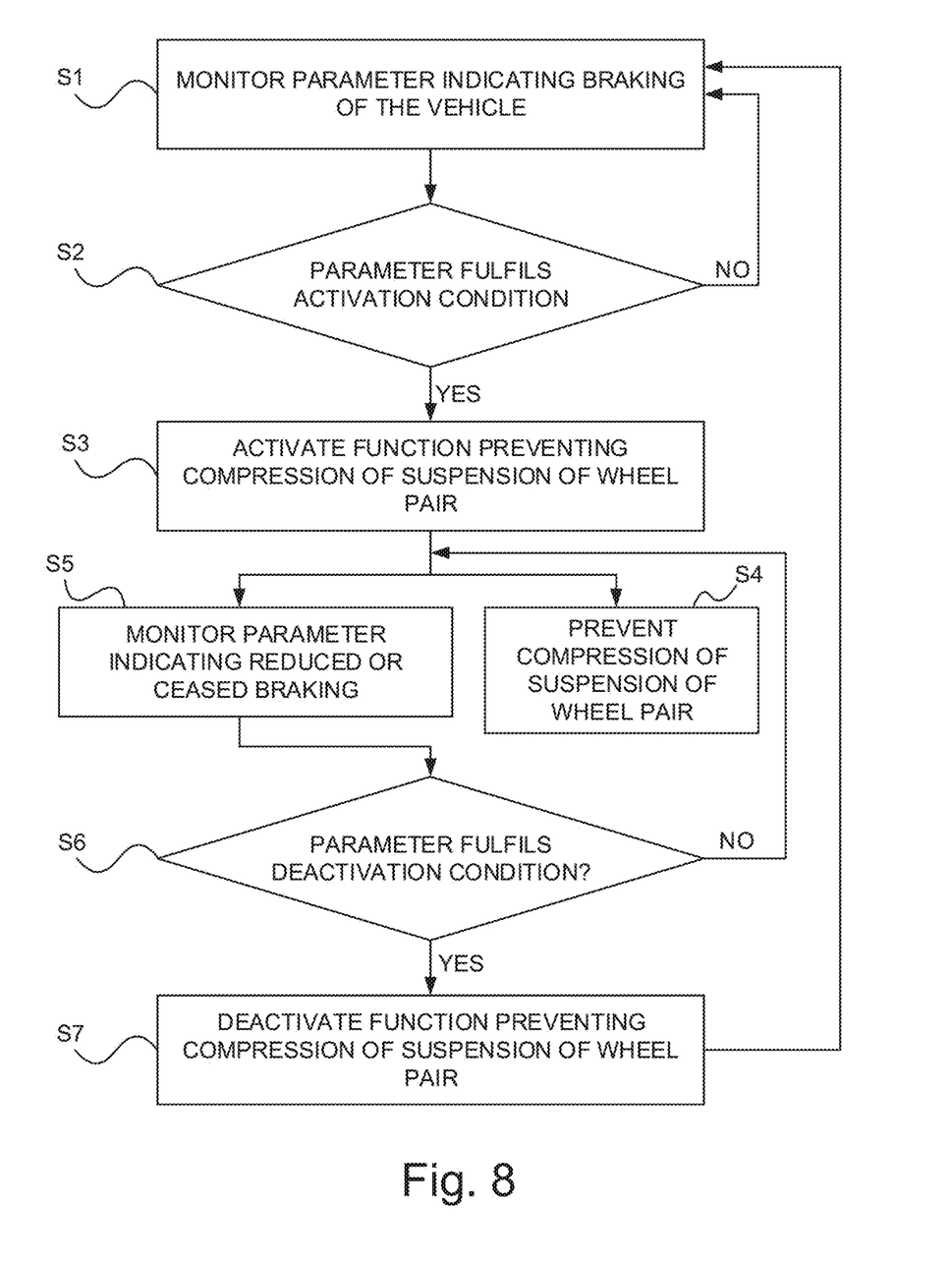
FIG. 8 is a flow chart showing a method for controlling the suspension system of a motor vehicle, according to an embodiment of the invention.

FIG. 8 schematically illustrates a flow chart showing a method according to an embodiment of the present invention.

The method comprises a first step S1 in which at least one first parameter (the activation parameter) indicating braking of the motor vehicle is monitored.

In a second step S2 it is checked whether the activation parameter fulfils an activation condition. If the activation condition is not fulfilled the method returns to step S1 but if the activation condition is fulfilled the method continues to step S3.

In step S3 the above described function (the suspension lock) preventing compression of the suspension of at least one wheel pair 2a/2b of the vehicle 1, typically at least the front wheel pair in the current direction of movement of the vehicle, whereby the method continues to the parallel steps S4 and S5.

In step S4 compression of suspension of at least one wheel pair 2a/2b of the vehicle is prevented as described above, at the same time as another parameter (deactivation parameter) is monitored in a parallel step S5. As also mention above the deactivation parameter may be another or the same parameter as the activation parameter.

In a subsequent step S6 it is checked whether the deactivation parameter fulfils a deactivation condition. If the deactivation condition is not fulfilled the method returns to the parallel steps S4 and S5 but if the activation condition is fulfilled the method continues to step S7.

In step S7 the function (suspension lock) preventing compression of suspension of the wheel pair, wherein the method returns to step S1.

The invention has been described for a tracked vehicle. However, a heeled vehicle could also comprise a suspension system according to the present invention. For example the lamella package could be used on a wheeled vehicle by being connected at a fixation of an arm in the wheel suspension. A linear damper may also be used for wheeled vehicles, for example together with an externally arranged coil spring such that a spring leg is formed.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for controlling a suspension system of a motor vehicle comprising a vehicle body and a plurality of wheel pairs, wherein the suspension system comprises spring members arranged for resilient connection between the wheels of the vehicle and said vehicle body, wherein the method comprises the step of:
monitoring at least one first parameter indicating braking of the motor vehicle; and
when said parameter indicates braking of the motor vehicle, preventing compression of the spring members of at least one wheel pair of the motor vehicle for counteracting a rotation of the vehicle body in connection to braking, wherein the step of preventing compression of the spring members is performed such that wheel suspension compression is prevented only if wheel forces from a ground acting on wheels in the wheel pair do not exceed a certain threshold value.

2. A method according to claim 1, wherein the step of preventing compression of the spring members comprises applying a locking torque or a locking force on the spring members or thereto connected components.

3. A method according to claim 2, wherein the locking torque or the locking force is applied in such a way that compression of the spring members is prevented only if wheel forces acting on wheels in the wheel pair from a ground do not cause a counter directed torque or a counter directed force exceeding said locking torque or locking force.

4. A method according to claim 1, further comprising the steps of:
determining whether said first parameter fulfils at least one activation condition, and
activating a function for preventing compression of said spring members if the activation condition is fulfilled.

5. A method according to claim 4, wherein said activation condition is one of or a combination of:
a condition for a position change of a brake member of the vehicle;
a condition for a brake pressure in the vehicle, and
a condition for a retardation of the vehicle.

6. A method according to claim 4, further comprising the steps of:
monitoring at least one second parameter, and
determining whether said second parameter fulfils at least one deactivation condition, and
deactivating said function for preventing compression of said spring members if the deactivation condition is fulfilled.

7. A method according to claim 6, wherein said deactivation condition is one of or a combination of:
a condition for a position change in a brake member of the vehicle;
a condition for a brake pressure in the vehicle;
a condition for a retardation of the vehicle;
a condition for a speed of the vehicle, and
a condition for a time that has elapsed since said function was activated.

8. A non-transitory storage medium storing thereon a computer program for controlling a suspension system of a motor vehicle comprising a vehicle body and a plurality of wheel pairs, where the suspension system comprises spring members arranged for resilient connection between the wheels of the vehicle and said vehicle body, suspension regulating members, and a control unit for controlling the suspension regulating member, wherein the computer program, when executed by a processor in said control unit, causes the control unit perform the method according to claim 1.

9. A suspension system for a motor vehicle comprising a vehicle body and a plurality of wheel pairs, wherein the suspension system comprises:
spring members arranged for resilient connection between the wheels of the vehicle and said vehicle body;
suspension regulating members, and
a control unit configured to control said suspension regulating members and monitor at least one first parameter indicating braking of the vehicle, wherein said control unit is configured to, when said parameter indicates braking of the motor vehicle, control the suspension regulating member such that compression of the spring members of the at least one wheel pair of the motor vehicle is prevented for counteracting rotation of the vehicle body in connection to the braking, wherein the suspension regulating member and/or the control unit are configured such that compression of the spring members is prevented only if wheel forces from a ground acting on wheels in the wheel pair do not exceed a certain threshold value.

10. A spring system according to claim 9, wherein the suspension regulating member is configured to apply a locking torque or a locking force on the spring members or components connected thereto.

11. A suspension system according to claim 10, wherein the suspension regulating member is configured to apply said locking torque or locking force in such a way that compression of the spring members is prevented only if wheel forces acting on wheels in the wheel pair from a ground do not cause a counter directed torque or counter directed force exceeding said locking torque or locking force.

12. A suspension system according to claim 9, wherein the control unit is configured to determine whether said first parameter fulfils at least one activation condition and activate a function for preventing compression of said spring members if the activation condition is fulfilled.

13. A suspension system according to claim 12, wherein said activation condition is one of or a combination of:
- a condition for a position change of a brake member of the vehicle;
- a condition for a brake pressure in the vehicle, and
- a condition for a retardation of the vehicle.

14. A suspension system according to claim 12, wherein the control unit is configured to monitor at least one second parameter, determining whether said second parameter fulfils at least one deactivation condition, and deactivate said function for preventing compression of said spring members if the deactivation condition is fulfilled.

15. A suspension system according to claim 14, wherein said deactivation condition is one of or a combination of:
- a condition for a position change in a brake member of the vehicle;
- a condition for a brake pressure in the vehicle;
- a condition for a retardation of the vehicle;
- a condition for a speed of the vehicle, and
- a condition for a time that has elapsed since said function was activated.

16. A suspension system according to claim 9, further comprising a damping system where damping members are arranged to damp the suspension in said spring members, wherein the suspension regulating member is arranged via said damping member to provide a high damping torque on said spring member, wherein the damping torque constitutes a locking torque preventing compression of the spring members.

17. A suspension system according to claim 16, wherein the suspension regulation member comprises torque generating members and wherein the damping members comprises rocker arms rotatably journalled in said torque generating members and connected to said spring members, wherein the control unit is configured to prevent compression of the spring members by controlling the torque generating member to apply a locking torque on said rocker arms.

18. A motor vehicle that comprises a suspension system according to claim 9.

19. A motor vehicle according to claim 18, wherein said vehicle is a tracked vehicle comprising propulsion tracks arranged to run around said wheels.

* * * * *